United States Patent Office 3,390,523
Patented July 2, 1968

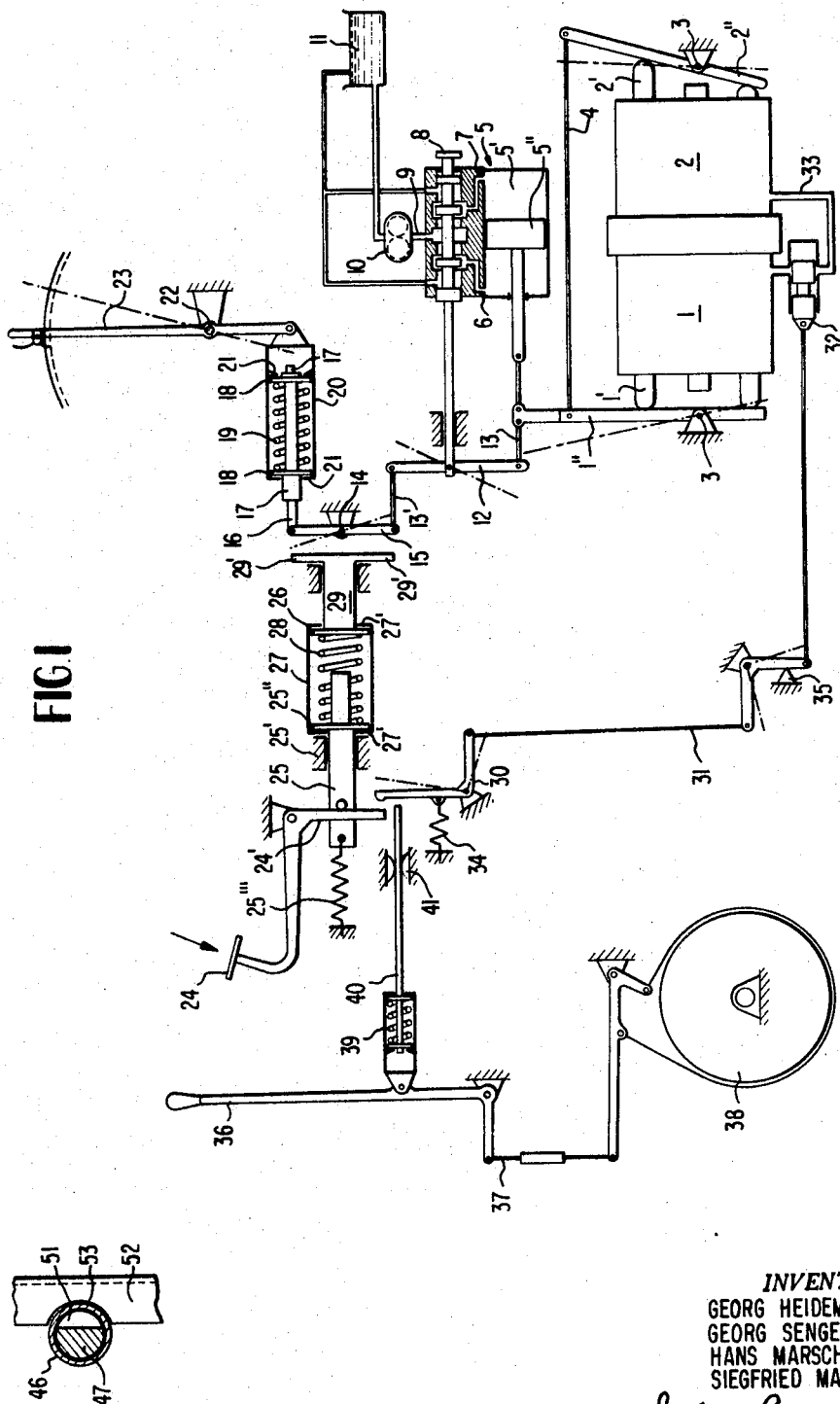

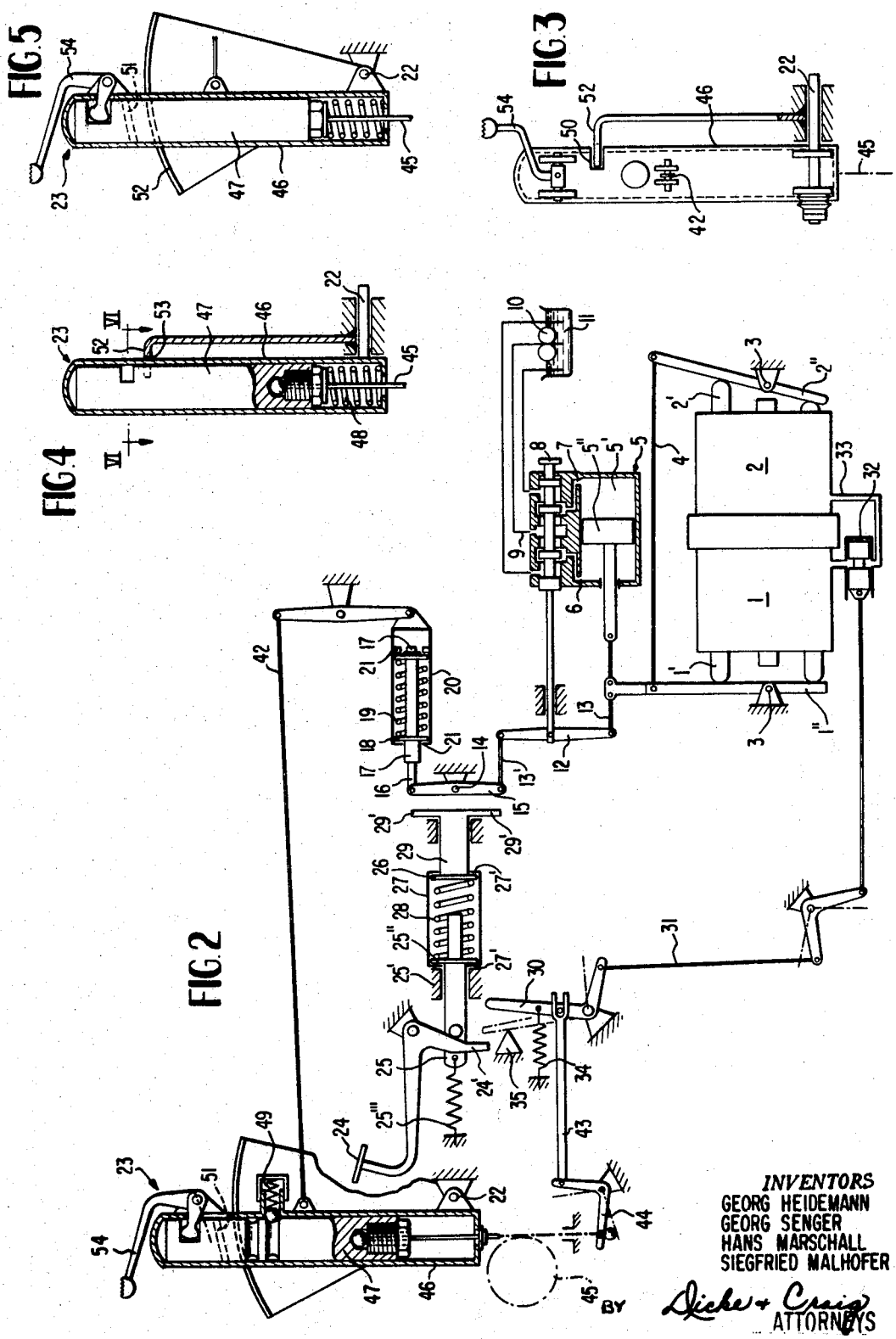

3,390,523
CONTROL DEVICE FOR A HYDROSTATIC CONVERTER
Georg Heidemann, 1 Jorglweg; Georg Senger, Hohenwartstr. 38; Hans Marschall, 89 Bertoldshofen; and Siegfried Malhofer, 47 Krankenhausstr., all of Marktoberdorf, Germany
Filed May 3, 1966, Ser. No. 547,230
Claims priority, application Germany, May 7, 1965, F 45,987
16 Claims. (Cl. 60—53)

ABSTRACT OF THE DISCLOSURE

A control system is described wherein the driver of a vehicle may move the hand lever controlling the vehicle into a desired running or stopped position immediately and thereafter give his full attention to other mechanisms involved in the running of the vehicle. The control system is of the type wherein adjustment of the primary and/or the secondary portion of a hydrostatic converter is required in controlling the vehicle. With the present control desired changes in the driving condition may be preselected by an immediate or instantaneous adjustment of a hand lever or foot pedal, and with which an immediate stopping of the vehicle can be accomplished. For this purpose, pre-tensioned springs are inserted in the operating linkage between the hand lever and the foot pedal and the servo piston that actuates the hydrostatic converter. Immediate actuation of the hand lever or gradual action of the foot pedal, causes the operating linkage, without compression of the pre-tensioned springs, to adjust the position of the servo piston into a new open or running position. Through compression of the one spring immediate actuation of the foot pedal allows a second part of the operating linkage to be immediately adjusted into an end position whereby a short-circuit valve between the primary and secondary portion of the hydrostatic converter is opened to its short-circuit position. This results in quickly inactivating the hydrostatic converter thus preventing further positive drive of the vehicle controlled by the converter. The pre-tensioned spring inserted between the hand lever and the operating linkage is weaker and may be overcome by a pre-tensioned spring inserted between the foot pedal and the operating linkage. In addition, operating linkage is provided between the short-circuit valve means and a hand brake lever whereby the short-circuit valve means is operated by the hand brake lever and a third pre-tensioned spring is inserted in the additional operating linkage between the hand brake lever and the short-circuit valve means to accommodate immediate action of the hand brake lever.

---

This invention relates to a control system for a hydrostatic converter for motor driven vehicles.

More specifically, the invention relates to a control system for adjusting the primary and/or the secondary portion of a hydrostatic converter for motor vehicles. The new and improved control system generally includes a servomotor having a servo piston operated by fluid under pressure and which can be adjusted in one direction or the other to control the operation of the hydrostatic converter. The direction of movement or position of the servo piston in turn may be adjusted by means of either a hand lever as well as a pedal which in the open or speed-adjusting position, controls a servo valve that is resettable into neutral by means of a follower control.

In known control devices for hydrostatic converters, the hand lever and the pedal, respectively, are connected to the servo piston through a lever linkage. With such known devices, the speed of the adjusting movement of the servomotor is dependent on the existing supply capacity of the auxiliary pump, and this in turn is dependent on the relative speed of the engine. For this reason, particularly at slow speed, the servo valve controlling the servo piston must be held in the open position until shortly before the piston reaches the desired adjustment in order to assure sufficient flow of pressure fluid to the piston. As a consequence, the operator of a vehicle using such known control device must exert continuous attention to the hand lever for so long until the desired driving condition is reached. This requires the attention of the driver for a considerable time so that he, in the meantime, can only tend to other operations of the vehicle in a restricted manner. This mode of operation is particularly disadvantageous during stopping which is generally restricted to a certain positive stopping distance. If this stopping distance is judged too short, the vehicle drives beyond the desired stopping point. This can easily result in accidents.

It is therefore a primary purpose of the invention to provide a new and improved control system with which desired changes in the driving condition may be preselected by an immediate or instantaneous adjustment of the hand lever or the pedal, and with which an immediate stopping of the vehicle can be accomplished.

A feature of the present invention is the provision of pre-tensioned springs inserted in the operating linkage between the hand lever and foot pedal and the servo piston. In operation, immediate actuation of the hand lever or gradual action of the foot pedal, causes the operating linkage, without compression of one of the springs, to adjust the position of the servo piston into a new open or running position. Through compression of the said one spring by immediate actuation of the foot pedal, a second part of the operating linkage causes the pedal to be immediately adjusted into an end position whereby a short-circuit valve between the primary and secondary portion of the hydrostatic converter, is opened into its short-circuit position. This results in activating the hydrostatic converter, thus preventing further positive drive of the motor driven vehicle controlled by the hydrostatic converter.

According to a further characteristic of the invention, an adjusting lever is provided in the operating linkage between the hand lever and the servo piston which can be separately reset to drive the servo piston into the neutral position. This is achieved by a reset member connected to the foot pedal through the medium of said one spring.

According to another characteristic of the invention, the pretensioned spring inserted between the hand lever and the said adjusting lever is weaker and may be overcome by the spring between the foot pedal and reset member.

A further characteristic feature of the invention is the provision of additional operating linkage between the short circuit valve means and a hand brake lever whereby the short circuit valve means is operable by the hand brake lever. A pretensioned spring also is inserted in the additional operating linkage between the hand-brake lever and the short circuit valve means to accommodate immediate actuation of the hand brake lever.

The control system according to the invention offers the advantage that the driver of the vehicle, for example, may move the hand lever immediately and directly into a desired running or stopped position. Thereafter, further attention by the operator to the hand lever is not required since the servo valve will be held in its off-center open position by means of the first spring and adjustment of the primary and/or secondary portions of the hydrostatic converter takes place by way of the servomotor. Hence, the driver can give full attention to other things and can attend to further operational functions. In case he desires to stop suddenly, he can, at any time, depress the foot pedal immediately and entirely so that the short-circuit valve immediately interrupts further positive drive of the vehicle. It is therewith possible for the driver to stop the vehicle exactly at a desired position. Further, if the hand brake is engaged, the short-circuit valve also is held in its short-circuit position so that starting of the vehicle is practically only possible with the hand brake released.

Exemplary embodiments of the invention are schematically illustrated in the drawings which will be described in greater detail hereinafter. In the following description, like parts in each of the several figures have been given the same reference numeral. In the drawings:

FIGURE 1 shows one embodiment of an entire control system constructed in accordance with the invention;

FIGURE 2 shows the control system with another control feature by means of a hand lever;

FIGURE 3 shows another view of the hand lever employed in the control system of FIGURE 2;

FIGURE 4 shows a cross-sectional view of another construction of the hand lever used in the system of FIGURE 2;

FIGURE 5 shows a further cross-sectional view of the hand lever according to FIGURE 4; and FIGURE 6 shows a longitudinal section taken along line VI–VI of FIGURE 4.

A hydrostatic converter consists essentially of a primary portion 1 and a secondary portion 2 coupled to and driven by the engine which the converter controls. The two portions 1 and 2 are connected with each other through channels (not shown) and include axially movable piston 1' and 2', the stroke of which determines the speed of the engine being controlled. The stroke of the piston 1' and 2', which support themselves each at a wobble plate 1" and 2", is determined by the position of wobble plates 1" and 2" which hence determine the speed of the engine.

The wobble plates 1" and 2" are each pivotally arranged at pivot points 3 and connected with each other by a coupling line 4. The wobble plate 1" is directly connected to a servomotor 5 which comprises a fluid pressure positioned piston 5" guided in a cylinder 5'. It can be appreciated therefore that the position of piston 5" controls the angular position of wobble plates 2", and hence the speed of the engine. Lines 6 and 7 lead to the cylinder 5' which may be connected selectively with a fluid pressure supply line 9 by a control servo valve means comprised of a piston 8. Fluid is supplied from a storage reservoir 11 by an auxiliary pump 10 under pressure to the supply line 9. The entirety forms a servo control means for controlling the angular position of the wobble plates 1" and 2" and hence the hydrostatic converter.

The servo control means thus comprised is in turn controlled by follower linkage means formed by a reset lever 12 pivotally arranged at an extension of the servo piston 8. One arm of reset lever 12 is connected by means of an intermediate link 13 to the piston 5" of the servomotor 5 and the other arm thereof is connected by a further intermediate link 13' to one end of an adjusting lever 15 pivotally arranged about a fixed shaft 14. The other end of this adjusting lever 15 is connected to a link 16 which carries two enlarged diameter stops 17 spaced in relation to each other against which disks 18 rest loosely. The two disks 18 have a greater diameter than the stops 17, and a first pretensioned coil spring 19 is inserted between them. The spring 19 is arranged within a sleeve 20 which is provided on the inside thereof with stop rings 21 that rest against and stop the outer face of the disks 18. The central openings of the top rings 21 are sufficiently large for the stops 17 to pass therethrough. The entire structure including links 16, stops 17, disks 18, spring 19, sleeve 20, and stops 21 comprises a first pretensioned spring means which is coupled to and controlled by a first control lever means. The first control lever means is formed by a hand lever 23 pivotally arranged at the sleeve 20 and pivotable about an axle 22 fixed to the vehicle. The lever 23 may be pivotally secured in each of several positions by means of an arresting device or the like.

A second control lever means include a foot pedal 24 which engages, by means of a bell crank 24', a plunger 25. The plunger 25 is guided axially in a bearing 25', and is provided with a collar 25". This collar 25" and a co-acting disk 26 are enclosed in a sleeve-like housing 27 and rest on the inside thereof against a beaded edge 27'. A strong pretensioned coil spring 28 which is stronger than coil spring 19 is inserted between the edge 25" and the disk 26. Disk 26 rests against one end of a piston-like reset member 29 and preferably is connected therewith. The other end of this piston-like member 29 is provided with adjusting arms 29' which may rest against the adjusting level 15 on both sides of shaft 14. The adjusting arms 29' may also be constructed as adjusting disks. Pedal 24 and plunger 25 are held in the neutral position by means of a bias tension spring 25'''.

Upon the second control lever means comprised by foot pedal 24 being fully depressed, arm 24' contacts shortly before the pedal 24 attains its lower end position, a bell crank 30. Bell crank 30 is connected by means of a linkage 31 with a short-circuit valve means comprised by a piston 32 which is adjustable from a closing position into an open short-circuit position. In the short-circuit or open position, primary portion 1 and secondary portion 2 of the hydrostatic converter are brought into communication by means of a short-circuit channel 33 whereby further positive drive to the motor driven vehicle is interrupted. The short-circuit piston 32 is normally held in closing position by a spring 34 which position is advantageously fixed by means of a stop 35.

Finally, a hand brake control lever 36 may also be provided in a known manner which operates, by means of an adjustable linkage 37, a mechanical brake 38. A pusher link 40 is pivotally secured to the hand-brake lever 36 through a pre-tensioned spring 39, and the free end thereof is arranged in an axial guide 41. By movement of brake lever 36 towards the right, the end of link 40 will engage the bell crank 30 whereby the short-circuit piston 32 is adjusted through linkage 31. This is in addition to applying mechanical brake 38 to the vehicle being driven. By reason of the spring 39 which is compressed, the application of the mechanical brake 38 may be immediate while spring 39 accommodates any time lag due to inertia in the operation of the short-circuit piston 32. Thus, operation of the brake 38 is accomplished independently of short-circuit piston 32, yet wear of the brake lining is prevented by the assurance that further positive drive to the vehicle will be interrupted through the action of the short-circuit piston 32.

The control system as illustrated by solid lines in FIGURE 1 is at rest, and similarly, the vehicle which it controls is also at rest. During starting, hand lever 23 is moved, for example, into a position shown by dot and dash lines whereby spring 19 attempts to rotate the adjusting lever 15 in a counter-clockwise direction. This, however, is possible only within the small limited adjusted travel of the servo piston 8 so that the spring 19 is compressed; that is, link 16 enters into the sleeve 20. By means of the spring force, the control servo valve 8 is held in its right end position so that pressure fluid flows continuously into the right chamber of cylinder 5' of the servomotor 5 and pushes the piston 5" to the left. Upon the left disk 18 again coming to rest at the corresponding left stop ring 21 due to the expansion of the pretensioned spring 19, the adjusting lever 15, the return lever 12, and the wobble disks 1" and 2" will assume the position shown in dot and dash. This results in returning the servo control piston 8 to its neutral position. The adjusting process is therewith completed and as a result the secondary portion 2 of the hydrostatic converter rotates at a speed according to that position at which the servo piston 5 is set as selected by the hand lever 23. Adjustment in the other direction is accomplished similarly since it is believed obvious that by reason of the design of first spring means 19, it may be compressed from both sides. Hence, by appropriate setting of hand lever 23 the primary and secondary portions 1 and 2 of the converter may be speeded up or slowed down or stopped as desired. This, of course, results in speeding up, slowing down, or stopping the vehicle it controls.

The resetting of primary and secondary portions 1, 2 to accommodate smaller speeds or stopping of the vehicle may also be accomplished by gradual depression of foot pedal 24. Through pressure on pedal 24, the plunger 25 through spring 28 will move the piston-like member 29 to the right causing the adjusting lever 15 to be engaged by means of adjusting arms 29′ and to be returned toward the neutral position. Upon pedal 24 being fully depressed, i.e., when right end 29′ of piston 29 reaches its right end position, the adjusting lever 15 is returned to its neutral position. During this return process with the help of pedal 24, spring 28 is normally not compressed and hand lever 23 may remain in its displaced position. Because spring 28 is tensioned higher than is spring 19, the latter is compressed when pedal 24 is pushed down gradually, and again effects, after it is released, the automatic position for the predetermined speed of the vehicle set by lever 23.

Shortly before the right end position of piston 29 is reached upon pedal 24 being fully depressed, arm 24′ touches the bell crank 30 and adjusts through linkage 31 the short-circuit piston 32 towards the right so that the short-circuit line 33 is opened and further positive drive to the vehicle is interrupted. During release of pedal 24, it will, as a result of bias spring 25′′′, swing back into its starting position, and the short-circuit piston 32 is returned into its normally closed position as a result of spring 34.

The speed of starting and especially stopping the vehicle is accomplished in the above-described manner in accordance with the speed of adjustment of the position of piston 5″. The speed of adjustment of the position of piston 5″ is dependent on the capacity of the auxiliary pump 10 or a supply volume adjusted by another means and otherwise not influenced by hand lever 23 or pedal 24. Therefore, if the vehicle is to be stopped very suddenly, the pedal 24 is forcefully pushed all the way down. The adjusting lever 15 by design and due to the inertia of the system to which it is linked, is unable to yield quickly. Therefore, the spring 28 is compressed so that arm 24′ contacts immediately the bell crank 30 and moves thereby the short-circuit piston 32, as already described above, to the open position. By this means, the drive connection can be interrupted immediately, and the vehicle may be stopped quickly.

By means of the hand brake lever 36, the mechanical brake 38 may be locked through linkage 37. By tightening this hand-brake lever 36 in a clockwise direction, the push rod 40 contacts the bell crank 30 and rotates it also in a clockwise direction. This results in the short-circuit piston 32 being moved into its open position. Creeping of the vehicle even with a lightly tightened brake 38 is therefore eliminated. Spring 39 allows immediate presetting of brake 38 and therefore accommodates any time delay due to inertia, etc., involved in opening the short-circuit piston 32.

In order to simplify finding of the neutral position with the hand lever 23, the following arrangement can be made as shown in FIGURES 2–6 of the drawing.

In FIGURE 2, a push rod 43 is connected to a bell crank 30 and to a further bell crank 44 onto which a Bowden pull 45 or the like is attached. Hand lever 23 consists essentially of a sleeve 46 pivotable about a shaft 22 in which a sliding bolt 47 connected to the Bowden pull 45 is slidably supported. The sliding bolt 47 may be brought into, for example, an upper disconnect position as shown in FIGURE 2 and a lower connect position. Both positions are limited by a spring-biased stop device 49 so that the sliding bolt 47 remains in its arbitrarily adjusted position. The sleeve 46 is provided with a cutout 50 and a similar cutout 51 is provided in the sliding bolt 47. In the lower connected position of bolt 47, the two cutouts are arranged at the same elevation so that they can engage a curved guide path 52 in an arcuate guide member that cooperates with the hand lever 23. By this arrangement, the hand lever 23 may be rotated independently about shaft 22 to thereby set the position of servo piston 5″ and hence the speed of the vehicle. The centrally disposed (neutral) position of the arcuate guide path 52 is provided with a break-through 53 shown in FIGURE 6 so that the sliding bolt 47 may pass upward through sleeve 46 to its disconnect position, and by means of which the hand lever 23 is locked against pivotable movement or rotation. For moving sliding bolt 47 up or down within sleeve 46 an operating lever 54 is provided at the top of sleeve 46.

It can be seen that in the central neutral position of the hand lever 23 as shown, the sliding bolt 47 is in its upper disconnect position and hand lever 23 is locked against rotation. The hydrostatic converter 1 and 2 is thereby positioned for zero delivery, and the short-circuit piston 32 is in the short-circuit position. For starting, the sliding bolt 47 must be pressed first downwardly by means of the operating lever 54 until the locking device 49 falls into the upper stop groove to hold the sliding bolt 47 in the lower connect position. As a result of this action, the push rod 43 is, through the Bowden pull 45 and bell crank 44, moved towards the left so that the bell crank 30 through the force of spring 34 is rotated in a counterclockwise direction and the short-circuit piston 32 by way of linkage 31 is moved into its closed position. Subsequently, hand lever 23 may be pivotally rotated about shaft 22 so that adjustment of the servo piston 8 takes place with the help of additional linkage 42, whereby the servo motor 5 adjusts the speed of hydrostatic converter 1, 2, as described above. The vehicle then begins to move. Stopping of the vehicle takes place in the reverse manner. It should be noted, however, that only in neutral position of hand lever 23, may the sliding bolt 47 be moved into its lower disconnect position since in the drive position the guide path 52 rests in cutout 51 to prevent an axial movement of sliding bolt 47. If the vehicle is to be suddenly stopped, hand lever 23 by compressing spring 19, may be moved quickly to its neutral position and sliding bolt 47 dropped down to its lower disconnect position. As a result, the short-circuit piston 32 is moved into its open short-circuit position.

In FIGURES 4 and 5, another embodiment of hand lever 23 is shown in which resetting of sliding bolt 47 into an upper disconnect position is accomplished automatically by a compression spring 48 upon hand lever 23 being moved to its central neutral position. In the drive position of hand lever 23, cutout 51 is in contact with the guide path 52 and can, at the same time, serve for arresting of hand lever 23 in the arbitrarily selected drive position. In the central netural position where the break-through opening 53 is located, sliding bolt 47 snaps automatically upwardly as a result of spring 48 so that the short-circuit piston 32 returns into its short-circuit position.

It is also feasible to execute adjustment of the short-circuit piston 32 through appropriate linkage to provide an additional movement of hand lever 23, for example, perpendicular to the direction of adjustment for setting the speed.

Finally, short-circuit piston 32 could also, independently of the position of the hand lever 23, be adjusted into its disconnect position, for example, by omission of guide path 52. With such an arrangement, however, the neutral position of hand lever 23 should advantageously be provided with an arresting device. It is obvious that short-circuit piston 32 could be operated independently from hand lever 23 as well as pedal 24 and that by operating the pedal 24 the vehicle could be stopped and that by releasing it the driving conditions preselected by hand lever 23 are again automatically assumed. Transmission between hand lever 23 and pedal 24, respectively, and short-circuit piston 32 which is shown as being mechanical may be accomplished in another manner, for example, hydraulically or electro-hydraulically.

While we have shown several embodiments of the present invention, it is understood that the same is not limited thereto but is susceptible of numerous changes and modifications as known to a person skilled in the art. We therefore do not wish to be limited to the details of the embodiments shown and described herein but intend to cover all such changes and modifications as are encompassed by the scope of the appended claims.

We claim:

1. In a control system for a hydrostatic converter for motor driven vehicles including primary converter control means operatively coupled to and directly controlling the operation of said hydrostatic converter, servo control means including a fluid pressure positioned piston coupled to and directly controlling the primary converter control means, servo valve means for controlling the flow of pressurized fluid to said piston, first control lever means, and follower linkage means interconnecting the first control lever and the servo valve means for controlling thereby the operation of the hydrostatic converter, the improvement comprising first pretensioned spring means having a normal condition operatively connected in the follower linkage means for controlling the servo control means while allowing for substantially immediate presetting of the control lever means to a desired speed setting, said first spring means being tensioned by immediate presetting of the control lever means to accommodate the immediate presetting of the control lever means, and said first spring means thereafter being movable back to its normal condition through self action thereby to adjust the servo control means to the new setting established by the control lever means and thereby accommodate the time response of the servo control means at any pressure level yet accommodating immediate presetting of the control lever means.

2. The control system set forth in claim 1, further characterized by second control lever means, and piston-like reset member means operatively coupled to and acting on an adjusting lever in said follower linkage means to control operation of the servo control means in conjunction with said first pretensioned spring means.

3. The control system set forth in claim 2, further characterized by second pretensioned spring means intercoupled between the second control lever means and the piston-like reset member means, said second pretensioned spring means being stronger than said first pretensioned spring means and subject to being overcome by the combined instantaneous inertia of said first spring means, said follower linkage means and said servo control means, short-circuit valve means coupled to and short-circuiting the hydrostatic converter, and second linkage means interconnecting said short-circuit valve means and said second control lever means, said second linkage means being engaged and controlled by said second control lever means in its fully actuated position and upon the flexure of said second pretensioned spring means upon immediate actuation of said second control lever means.

4. The control system set forth in claim 3, further characterized by hand brake control lever means for actuating the braking mechanism of the motor driven vehicle to which the hydrostatic converter is coupled, and third linkage means intercoupling said hand brake lever means and said second linkage means for opening said short-circuit valve means in response to the actuation of said hand brake control lever means.

5. The control system set forth in claim 4, wherein the third linkage means includes third pretensioned spring means for accommodating immediate actuation of the hand brake control lever means and the time response (inertia) of the short-circuit valve means.

6. The control system set forth in claim 5, wherein the first control lever means is a hand-actuated lever exercizing semi-permanent control over the operation of the servo control means, and the second control lever means is a foot pedal actuated lever exercizing immediate variable control over the operation of the servo control means and the short-circuit valve means.

7. The control system set forth in claim 3, further characterized by additional linkage means interconnecting said first control lever means and said short-circuit valve means for controlling operation of said short-circuit valve means by said first control lever means.

8. The control system set forth in claim 6, further characterized by additional linkage means interconnecting said first control lever means and said short-circuit valve means for controlling operation of said short-circuit valve means by said first control lever means.

9. The control system set forth in claim 7, wherein the first control lever means comprises a pivotable sleeve, a sliding bolt reciprocally movable in said sleeve and having a connect position wherein the sleeve and bolt can be pivoted to control operation of said servo control means through the medium of said first follower linkage means and having a neutral disconnect position wherein the short-circuit valve means is actuated through the medium of the additional linkage means.

10. The control system set forth in claim 8, wherein the first control lever means comprises a pivotable sleeve, a sliding bolt reciprocally movable in said sleeve and having a connect position wherein the sleeve and bolt can be pivoted to control operation of said servo control means through the medium of said first follower linkage means and having a neutral disconnect position wherein the short-circuit valve means is actuated through the medium of the additional linkage means.

11. The control system set forth in claim 9, wherein the pivotable sleeve and bolt have corresponding grooves formed therein, and wherein the system is further characterized by an arcuate shaped guide having a guide path portion that coacts with the grooves in the sleeve and bolt during pivotal movement of the sleeve, said guide having a centrally disposed opening in the arcuate guide path that allows the bolt to be reciprocally moved to the neutral disconnect position wherein the short-circuit valve means is actuated through the medium of the additional linkage means, the centrally disposed opening in the guide path also serving as a stop to prevent pivotal movement of the control lever means while the bolt is in the neutral disconnect position.

12. The control system set forth in claim 10, wherein the pivotable sleeve and bolt have corresponding grooves formed therein, and wherein the system is further characterized by an arcuate shaped guide having a guide path portion that coacts with the grooves in the sleeve and bolt during pivotal movement of the sleeve, said guide having a centrally disposed opening in the arcuate guide path that allows the bolt to be reciprocally moved to the neutral disconnect position wherein the short-circuit valve means is actuated through the medium of the additional linkage means, the centrally disposed opening in the guide path also serving as a stop to prevent pivotal movement of the control lever means while the bolt is in the neutral disconnect position.

13. The control system set forth in claim 11, further characterized by a spring biased stop for holding the bolt in either the connect or disconnect position, and a separately movable actuating lever pivotally supported on the sleeve and acting on the bolt for moving the same to the connect or disconnect position.

14. The control system set forth in claim 12, further characterized by a spring biased stop for holding the bolt in either the connect or disconnect position, and a separately movable actuating lever pivotally supported on the sleeve and acting on the bolt for moving the same to the connect or disconnect position.

15. The control system set forth in claim 11, further characterized by spring biasing means supported in the sleeve and acting on the bolt for holding the bolt in the connect position in conjunction with the guide path upon the control lever being pivotally moved and for automatically returning the bolt to its neutral disconnect position upon the control lever being pivoted to the central stop position.

16. The control system set forth in claim 12, further characterized by spring biasing means supported in the sleeve and acting on the bolt for holding the bolt in the connect position in conjunction with the guide path upon the control lever being pivotally moved and for automatically returning the bolt to its neutral disconnect position upon the control lever being pivoted to the central stop position.

References Cited
UNITED STATES PATENTS

| | | | |
|---|---|---|---|
| 2,381,795 | 8/1945 | Willett | 60—53 |
| 2,976,685 | 3/1961 | Thoma et al. | 60—53 |
| 3,157,998 | 11/1964 | Harris | 60—53 |
| 3,212,263 | 10/1965 | Hann | 60—53 |

EDGAR W. GEOGHEGAN, *Primary Examiner.*